United States Patent [19]

Morita

[11] Patent Number: 5,297,042
[45] Date of Patent: Mar. 22, 1994

[54] KEYWORD ASSOCIATIVE DOCUMENT RETRIEVAL SYSTEM

[75] Inventor: Tetsuya Morita, Yokohama, Japan

[73] Assignee: Ricoh Company, Ltd., Tokyo, Japan

[21] Appl. No.: 593,817

[22] Filed: Oct. 5, 1990

[30] Foreign Application Priority Data

Oct. 5, 1989 [JP] Japan ................... 1-260693

[51] Int. Cl.$^5$ ............................................. G06F 15/38
[52] U.S. Cl. ................................................. 364/419.19
[58] Field of Search ................... 382/13-15; 395/20, 24-27; 364/419, 200 MS File, 900 MS File

[56] References Cited

U.S. PATENT DOCUMENTS

| | | | |
|---|---|---|---|
| 4,542,477 | 9/1985 | Noyori et al. | 364/900 |
| 4,554,631 | 11/1985 | Reddington | 364/283.2 |
| 4,653,107 | 3/1987 | Shojima et al. | 382/13 |
| 4,823,306 | 4/1989 | Barbic et al. | 364/900 |
| 4,849,898 | 7/1989 | Adi | 364/419 |

OTHER PUBLICATIONS

Myamoto et al, "Generation of a Pseudothesaurus for Information Retrieval Based on Cooccurrences and Fuzzy Set Operations," *IEEE Transactions on Systems, Man, Cybernetics*, vol. SMC-13, No. 1, Jan./Feb. 1983, pp. 62-70.

Kouske et al "String Matching Hardware Architecture," *Denshi Tsushin Gakkai Kenkyo Hokoku*, CPSY 86-57, Jul. 1986, pp. 57-68.

Miyaka et al, "Generation of Descriptor Relations of a Database Based on Fuzzy Sets and Application to Information Retrieval," *Fuzzy System Symposium*, Tokyo, May 30-31, 1988, pp. 309-312.

Atsushi Tamura et al, "An Automatic Document Classification Method based on the Keyword Frequency Analysis," *Information Processing Society of Japan*, 36th National Convention's Papers, 1988, 1st Term, pp. 1305 and 1306.

Hayashi, "Quantitative Method," *Toyo Keizai Shinbunsha* 1974, pp. 27-36.

Ronald A. Fisher, "Statistical Method For Research Workers," Oliver & Voyd Limited Publ., 1925, pp. 62-89 (English Translation from pp. 67-73.

*Primary Examiner*—Roy N. Envall, Jr.
*Assistant Examiner*—Frantzy Poinvil
*Attorney, Agent, or Firm*—Mason, Fenwick & Lawrence

[57] ABSTRACT

A document retrieval system includes an inputting unit for inputting a retrieval condition including one or a plurality of keywords and a weight value for each keyword, an operating unit having first factors corresponding to relationship values, each relationship value being defined as a degree of the relationship between two keywords out of keywords which are predetermined in the document retrieval system and second factors corresponding to importance values, each importance value being defined as a degree of importance of a keyword in each one of a plurality of documents which are predetermined in the document retrieval system, the operation unit generating a relevance value, which represents a degree of relevance in satisfying a user's requirement, for each of the documents on the basis of the retrieval condition input from the inputting unit, the first factors and the second factors, and an outputting unit for outputting the relevance value for each of the documents as a retrieval result.

9 Claims, 2 Drawing Sheets

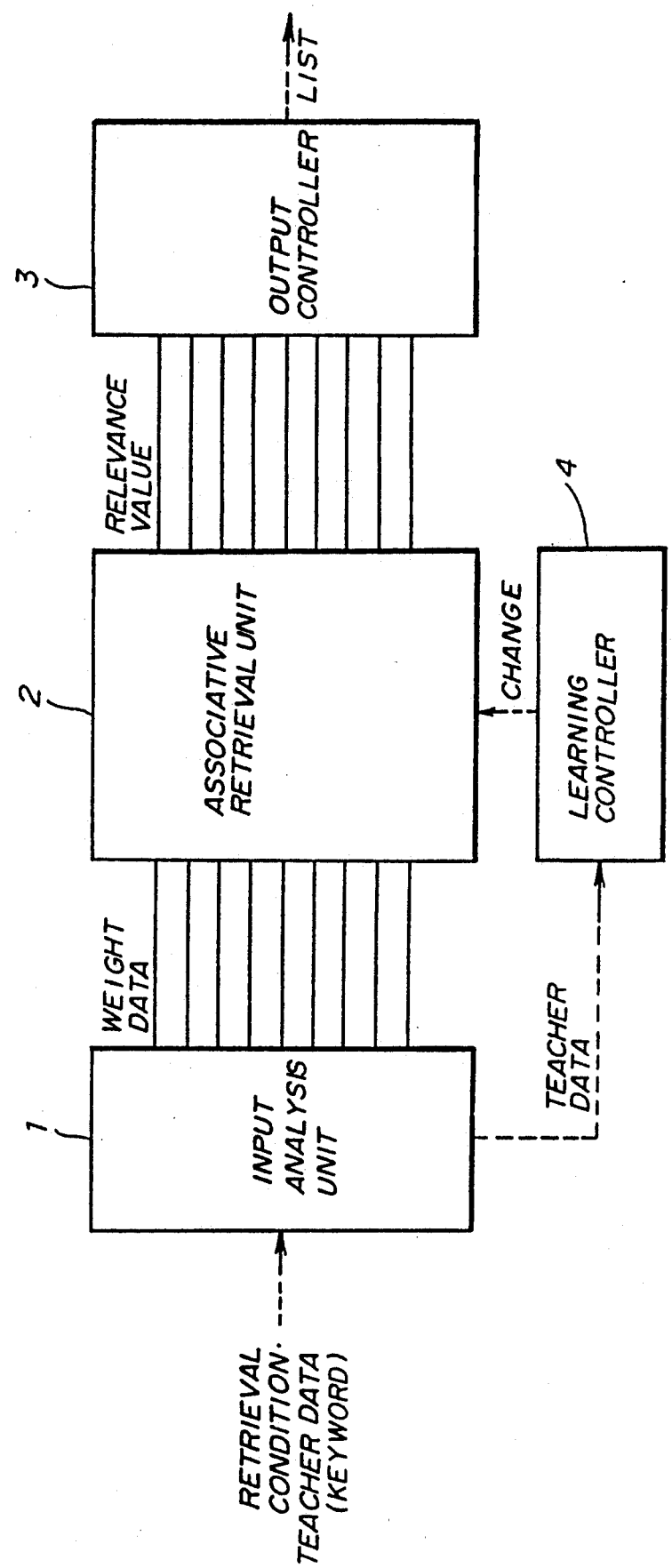

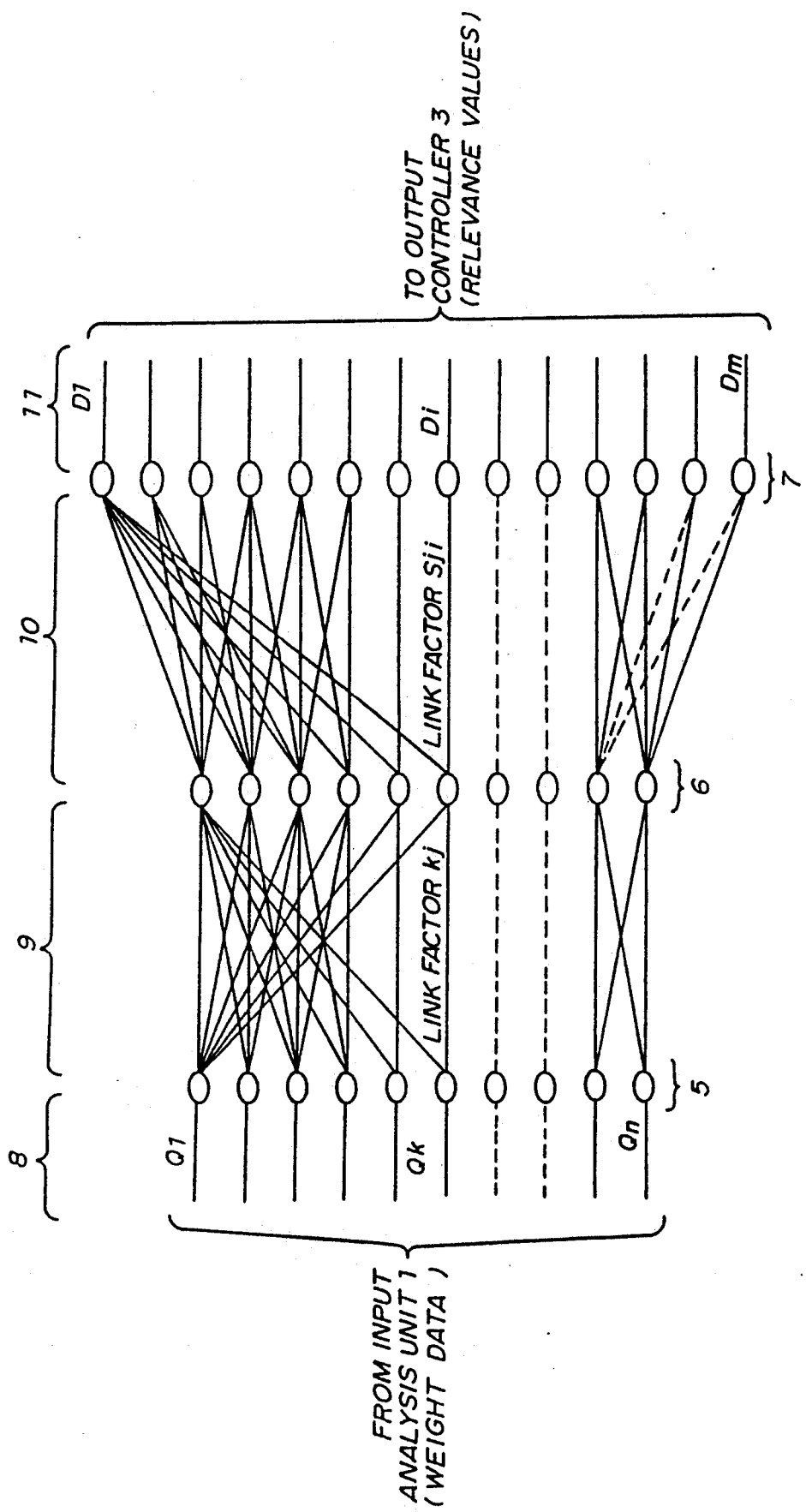

KEYWORD ASSOCIATIVE DOCUMENT RETRIEVAL SYSTEM

BACKGROUND OF THE INVENTION

The present invention generally relates to a keyword associative document retrieval system, more particularly to a keyword associative document retrieval system capable of retrieving documents which are required by a user.

Recently, information included in documents such as newspapers, magazines, books and treatises has increased so that the frequency of utilization of a large scale data base, such as JOIS, NEED-IR, DIALOG, has been increasing.

For example, "Automatic Classification of Document Using Statistical Method " ( Information Processing Society of Japan, the 36th National Convention's Papers : 1988, 1st term ) discloses a method called a $\chi^2$ examination. In the $\chi^2$ examination, documents are automatically classified into predetermined fields by use of a statistical method. In the $\chi^2$ examination, a $\chi^2$ value is calculated as an indicator which represents a deviation of an occurrence frequency of a keyword in the fields. The occurrence frequency of the keyword is the frequency with which the keyword occurs in a field. The applied occurrence frequency is normalized on the basis of the theoretical occurrence frequency so that the $\chi^2$ value is obtained.

In "Quantitative Method ( Hayashi )" published in a newspaper of Toyo Keizai Shinbunsha in 1974, a method, which is one of the statistical methods which uses the $\chi^2$ value, for searching a relationship among the fields is disclosed.

In these conventional methods in which the documents are retrieved by use of the $\chi^2$ examination, a large number of fields, each corresponding to one or more keywords, must be determined to correctly retrieve documents which are required by the user. It is thus hard to obtain the $\chi^2$ values for all the fields.

SUMMARY OF THE INVENTION

Accordingly, a general object of the present invention is to provide a document retrieval system in which the disadvantages of the aforementioned prior art are eliminated.

A more specific object of the present invention is to provide a document retrieval system capable of retrieving a set of documents which are required by a user.

Another object of the present invention is to provide a document retrieval system which can be constructed with ease.

The above objects of the present invention are achieved by a document retrieval system comprising inputting means for inputting a retrieval condition including one or a plurality of keywords and a weight value for each keyword, operating means having first factors corresponding to relationship values, each relationship value being defined as a degree of a relationship between two keywords out of keywords which are predetermined in the document retrieval system and second factors corresponding to importance values, each importance value being defined as a degree of importance of a keyword in each one of a plurality of documents which are predetermined in the document retrieval system, the operating means, coupled to the inputting means, generating a relevance value, which represents a degree of relevance in satisfying a user's requirement, for each of the documents on the basis of the retrieval condition input from the inputting means, the first factors and the second factors, and outputting means, coupled to the operating means, for outputting the relevance value for each of the documents as a retrieval result.

Another object of the present invention is to provide a document retrieval system capable of being changed to a system suitable for the user's requirement.

The above object of the present invention is achieved by a document retrieval system comprising the inputting means, operating means and outputting means described above, and further comprising learning means for changing the first factors and the second factors so that the relevance value for each of the documents becomes a value required by a user.

Additional objects, features and advantages of the present invention will become apparent from the following detailed description when read in conjunction with the accompanying drawings.

BRIEF DESCRIPTION OF THE DRAWINGS

FIG. 1 is a block diagram showing an example of a document retrieval system according to the present invention; and FIG. 2 is a diagram showing a structure of the associative retrieval unit shown in FIG. 1.

DESCRIPTION OF THE PREFERRED EMBODIMENTS

A description will now be given of a preferred embodiment of the present invention with reference to FIGS. 1 and 2.

Referring to FIG. 1, which shows a structure of an associative retrieval system, this associative retrieval system has an input analysis unit 1, an associative retrieval unit Z, an output controller 3 and a learning controller 4. The input analysis unit 1 analyzes a retrieval condition including one or more keywords and a weight value for each keyword input from an input device ( not shown in FIG. 1), such as a key board, by a user. The input analysis unit 1 supplies the keyword data and weight data $Q_k$ for each keyword data obtained by the analysis of the retrieval condition to the associative retrieval unit 2. The weight data Q is, for example, considered to be in a range between "0" and "1". Relationship values and importance values are set in the associative retrieval unit 2. Each of the relationship values is defined as the degree of a relationship between the keywords, and each of the importance values is defined as the degree of importance of the keyword in each document. In a case where the associative retrieval unit 2 has a neural network, the relationship value is represented by a link factor $K_{kj}$ in the neural network and the importance value of the keyword is represented by another link factor $S_{ji}$ thereof The associative retrieval unit 2 calculates a relevance value of each document on the basis of the weight data $Q_k$, the relationship values and the importance values in accordance with predetermined equations. The relevance value of each document represents the degree of relevance in satisfying the user's requirement. The associative retrieval unit 2 supplies the relevance value of each document to the output controller 3. The output controller 3 sorts all the documents in downward sequential order of the relevance value and makes a document list in which the documents are arranged in this order. The relevance values of the documents, which are arranged in downward sequential order thereof by the output controller 3, are displayed on a display unit (not shown in FIG. 1). such as a CRT, as a retrieval result. The user is capable of recognizing the relevance value of each document by looking at the relevance result displayed on the display unit. The user determines whether or not the retrieval result displayed on the display unit is satisfactory to the user. When the retrieval result does not satisfy the user, an expected value $T_j$ regarding each document input from the input device by the user is supplied to the learning unit 4 as a teacher data. The learning unit 4 changes the relationship values (link factors $W_{kj}$) and the importance values (link factors $S_{ji}$) on the basis of the teacher data in accordance with predetermined equations.

The associative retrieval unit 2 has a neural network as shown in FIG. 2. In this associative document retrieval system, it is assumed that the number of keywords which are allowed in this system is n and the number of documents which are capable of being retrieved is m. The neural network shown in FIG. 2 has a input layer 5, a hidden layer 6 and output layer 7. The number of units in both the input layer 5 and the hidden layer 6 are equal to the number of keywords which are allowed in this system. That is, the input layer 5 and the hidden layer 6 respectively have n units. The number of units in the output layer 7 is equal to the number of documents which are capable of being retrieved in this system. That is, the output layer 7 has m units. The input layer 5 is connected to the input analysis unit 1 shown in FIG. 1 by an input portion 8. The input layer 5 is linked to the hidden layer 6 by a keyword connection link 9 so that each of the units in the input layer 5 is linked to each of the units in the hidden layer 6. The output layer 7 is connected to the output controller 3 shown in FIG. 1 by an output portion 11. The hidden layer 6 is linked to the output layer 7 by a keyword-document connection link 10 so that each of the units in the hidden layer 6 is linked to each of the units in the output layer 7. A link factor $W_{kj}$ is given to a link between the k-th unit in the input layer 5 and the j-th unit in the hidden layer 6. The link factor $W_{kj}$ is determined by the relationship value between the k-th keyword and the j-th keyword. A link factor $S_{ji}$ is given to a link between the j th unit in the hidden layer 6 and the i-th unit in the output layer 7. The link factor $S_{ji}$ is determined by the importance value of the j-th keyword in the i-th document.

The relationship value between the k-th keyword and the j-th keyword is determined by use of an cooccurrence frequency for these keywords. The cooccurrence frequency represents the total number of times that the k-th keyword occurs with the j-th keyword in each of predetermined documents. The relationship value $R_{kj}$ is, for example, represented by the following formula;

$$R_{kj} = \frac{N_{kj}}{N_k + N_j - N_{kj}}$$

where $N_{kj}$ represents the total number of times that the k-th keyword occurs with the j-th keyword in each of the predetermined documents, $N_k$ represents the total number of times that the k th keyword occurs in each of the predetermined documents, and $N_j$ represents the total number of times that the j-th keyword occurs in each of the predetermined documents. The link factor $W_{kj}$ is determined on the basis of this relationship value $R_{kj}$ and is, for example, considered to be in a range between "0" and "1".

The importance value of the j-th keyword in the i-th document is determined by the frequency with which the j-th keyword occurs in the i-th document. In addition, the link factor $S_{ji}$ is determined on the basis of the importance value of the j-th keyword in the i-th document, and is, for example, considered to be in a range between "0" and "1".

The input portion 8 has n lines. The weight data $Q_k$ ( $k=1, 2,\cdots, n$ ) corresponding to the keywords K are supplied from the input analysis unit 1 via corresponding lines in the input portion 8 to corresponding units in the input layer 5. The weight data $Q_k$ supplied to the k-th unit in the input layer 5 is multiplied by the link factor $W_{kj}$ in the keyword connection link 9. That is, the product $Q_k * W_k$ is supplied via the link having the link factor $W_{kj}$ to the j-th unit in the hidden layer 6. In the j-th unit in the hidden layer 6, an addition for generating the sum of the n products $Q_k * W_{kj}$ ( $k=1, 2, \cdots, n$) which are supplied from n units in the input layer 5 via the keyword connection link 9 and a threshold processing are performed. Then the result $k_j$ obtained by the addition and the threshold processing is multiplied by the link factor $S_{ji}$ in the keyword-document connection link 10. That is, the product $K_j * S_{ji}$ is supplied via the link having the link factor $S_{ji}$ to the i-the unit in the output layer 7. In the i-th unit in the output layer 7, an addition for generating the sum of the n products $K_j * S_{ji}$ ( $j = 1, 2,\cdots, n$) which are supplied from n units in the hidden layer 6 via the keyword-document connection link 10 and a threshold processing are performed. Then the result $D_i$ is obtained as the relevance value. That is, each unit in the output layer 7 outputs the relevance value $D_i$ as the retrieval result.

The output portion has m lines, each of which is connected to a corresponding unit in the output layer 7. The relevance value $D_i$ is supplied via a corresponding line to the output controller 3. The output controller 3 sorts all the relevance values $D_i$ in downward sequential order of the relevance value, and generates a document list. In the document list, each of the document numbers identifying the documents and a corresponding relevance value make a pair, and the document numbers and the relevance values are arranged in the downward sequential order of the relevance value. The document list is displayed on the display unit.

It is possible to select a piecewise-linear function or a sigmoid function as a function f used in the threshold processing described above. In a learning process in this embodiment, as will be described later, the sigmoid function is selected as the function f used in the threshold processing.

The relevance value is calculated by the following formulas.

$$\text{net } j = \sum_{k=1}^{n} W_{kj} * Q_k \quad (1)$$

$$K_j = f(\text{net } j) \quad (2)$$

$$\text{net } i = \sum_{j=1}^{n} S_{kj} * K_j \quad (3)$$

$$D_i = f(\text{net } i) \quad (4)$$

where f(x) is given as $f(x) = 1/(1 + e^{-x})$.

The calculation of the relevance value in accordance with the formulas (1) through (4) is performed by the neural network shown in FIG. 2 as has been described above. Thus, in th formulas (1) through (4), $Q_k$ represents the weight data of each keyword, $W_{kj}$ represents the link factor in the keyword connection link 9, $S_{kj}$ represents the link factor in the keyword-document connection link 10, $K_j$ represents the output value of each unit in the hidden layer 6, and $D_i$ represents the output value of each unit in the output layer 7. That is, the $D_i$ represents the relevance value corresponding to each document.

A concrete description will now be given of an algorithm in the learning process.

The operator determines whether or not the retrieval result including the relevance value of the documents is required by the user. When there is at least a part which is not required by the user in the retrieval result, it is possible for the user to specify an expected value $T_i$ to the document. The expected value $T_i$ corresponds to a relevance value required by the user. When the user inputs the expected value $T_i$ from the input device, an evaluation function E is calculated by the following formula (5). In the learning process, the link factors $W_{kj}$ corresponding to the relationship values and the link factors $S_{ji}$ corresponding to the importance values of the keywords are respectively changed on the basis of the expected values $T_i$ so that the value of the evaluation function E is close to zero. This learning process is generally called the gradient descent method in the field of the neural network.

$$E = \sum_{i=1}^{m} E_i \quad (5)$$

where, $$E_i = (T_i - D_i)^2 / 2.$$

When it is assumed that changes of the link factors $W_{kj}$ and $S_{ji}$ are respectively represented as $\Delta W_{kj}$ and $\Delta S_{ji}$, the link factors $W_{kj}$ and $S_{ji}$ are respectively represented as follows.

$$W_{kj} = \alpha(W_{kj} + \Delta W_{kj}) \quad (6)$$

$$S_{ji} = \beta(S_{ji} + S_{ji}) \quad (7)$$

where $\alpha$ and $\beta$ are respectively learning coefficients which have constant values.

Thus, the changes $\Delta W_{kj}$ and $\Delta S_{ji}$ are obtained on the basis of the following formulas (8) and (9);

$$\Delta S_{ji} = -\eta \frac{\partial E}{\partial S_{ji}} \quad (8)$$

$$= -\eta \frac{\partial E}{\partial D_i} \cdot \frac{\partial E}{\partial net\ i} \cdot \frac{\partial net\ i}{\partial S_{ji}}$$

$$= \eta(T_i - D_i) \cdot D_i(1 - D_i) \cdot K_j$$

$$\Delta W_{kj} = -\xi \frac{\partial E}{\partial W_{jk}} \quad (9)$$

$$= -\xi \frac{\partial E}{\partial K_j} \cdot \frac{\partial K_j}{\partial net\ j} \cdot \frac{\partial net\ j}{\partial W_{jk}}$$

—continued $$= -\xi \sum_{i=1}^{m} \frac{\partial E}{\partial net\ i} \cdot \frac{\partial net\ i}{\partial K_j} \cdot f(net\ j) \cdot Q_k$$

$$= \xi \sum_{i=1}^{m} (T_i - D_i) \cdot D_i \cdot (1 - D_i) \times$$

$$\frac{\partial}{\partial K_j} \cdot \sum_{i=1}^{m} S_{ji} \cdot K_j \cdot f(net\ j) \cdot Q_k$$

$$= \xi \sum_{i=1}^{m} (T_i - D_i) \cdot D_i \cdot (1 - D_i) \times$$

$$S_{ji} \cdot K_j \cdot (1 - K_j) \cdot Q_k$$

In the learning process, new link factors $(W_{kj} + \Delta W_{kj})$ and $(S_{ji} + \Delta S_{ji})$ are respectively substituted for the former link factors $W_{kj}$ and $S_{ji}$.

The initial values of the link factors $W_{kj}$ and $S_{ji}$ are respectively determined on the basis of the relationship value and the importance value as has been described above. That is, the initial values of the link factors $W_{kj}$ and $S_{ji}$ are respectively determined without the learning process.

According to the present invention, the relevance value for each document is calculated on the basis of the relationship value between the keywords and the importance value of the keyword in every document and then the retrieval result in accordance with the relevance value for every document is obtained. Therefore, it is possible to retrieve a set of documents which are required by a user.

The present invention is not limited to the aforementioned embodiments, and variations and modifications may be made without departing from the scope of the claimed invention.

What is claimed is:

1. A document retrieval system comprising:
    a) inputting means for inputting one or a plurality of keywords and weight value for each keyword;
    b) a neural network including:
        1) an input layer having units corresponding to keywords that have been previously determined in said document retrieval system,
        2) a hidden layer having the same number of units as said input layer, and
        3) an output layer having units corresponding to documents that have been previously determined in said document retrieval system;
    wherein:
    i) each of the units in said input layer is linked to each of the units in said hidden layer by first link factors determined based on relationship values;
    ii) each relationship value is defined as a degree of a relationship between two keywords corresponding to linked units in said input and hidden layers;
    iii) each of the units in said hidden layer is linked to each of the units in said output layer by second link factors determined based on importance values;
    iv) each importance value is defined as a degree of importance of one of said keywords in one of said documents, the keyword and the document corresponding to linked units in said hidden and output layers;
    v) the weight value for each of the keywords is supplied from said inputting means to a corresponding one of the units in said input layer; and vi) an output value for each of the document is output from a corresponding one of the units in said output layer; and c) means, coupled to said neural network, for generating a relevance value for each of the documents based on the output value from a corresponding one of the units in said output layer of said neural network and for outputting the relevance value as a retrieval result, said relevance value being defined as a degree of relevance in satisfying a user's requirement.

2. A document retrieval system as claimed in claim 1, wherein each of the relationship values is determined by use of a cooccurrence frequency which represents a total number of times that both of the two keywords occur in each of the documents.

3. A document retrieval system as claimed in claim 1, wherein a relationship value $R_{kj}$ between a k-th keyword and a j-th-keyword is determined on the basis of the following formula;

$$R_{kj} = \frac{N_{kj}}{N_k + N_j - N_{kj}}$$

where $N_{kj}$ represents the total number of times that the k-th keyword occurs with the j-th keyword in each of the documents, $N_k$ represents the total number of times that the k-th keyword occurs in each of the documents, and $N_j$ represents the total number of times that the j-th keyword occurs in each of the documents.

4. A document retrieval system as claimed in claim 1, wherein each of the importance values is determined by the frequency with which the keyword occurs in each of the documents.

5. A document retrieval system as claimed in claim 1, wherein a first link factor between a k-th unit in said input layer and a j-th unit in said hidden layer is determined on the basis of said relationship value regarding a k-th keyword and a j-th keyword.

6. A document retrieval system as claimed in claim 1, wherein a second link factor between a j-th unit in said hidden layer and an i-th unit in said output layer is determined on the basis of said importance value of a j-th keyword in an i-th document.

7. A document retrieval system as claimed in claim 1 further comprising learning means including:
    means for changing said first link factors between the units in said input layer and the units in said hidden layer; and
    means for changing said second link factors between the units in said hidden layer and the units in said output layer;
    wherein the changing performed within the learning means is performed so as to cause said relevance value for each of the documents to approach a value input by the user.

8. A document retrieval system as claimed in claim 7, wherein said learning means includes:
    a) expected value inputting means for inputting an expected value which corresponds to a relevance value for each of the documents required by the user; and
    b) changing means for changing (1) said first link factors between the units in said input layer and the units in said hidden layer and (2) said second link factors between the units in the hidden layer and the units in said output layer on the basis of said expected value for each document, so as to cause said relevance value for each of the documents to approach the expected value input by said user.

9. A document retrieval system as claimed in claim 8, wherein said changing means includes means for changing said first link factors between the units in the input layer and the units in said hidden layer and said second link factors between the units in said hidden layer and the units in said output layer in accordance with a gradient descent method.

* * * * *